United States Patent
Cha

(10) Patent No.: US 7,895,637 B2
(45) Date of Patent: Feb. 22, 2011

(54) BROADCAST RECEIVER AND METHOD FOR PROVIDING DIAGNOSTIC INFORMATION

(75) Inventor: Sang Hoon Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 326 days.

(21) Appl. No.: 11/806,061

(22) Filed: May 29, 2007

(65) Prior Publication Data

US 2007/0283405 A1    Dec. 6, 2007

(30) Foreign Application Priority Data

Jun. 1, 2006    (KR)    ............ 10-2006-0049576

(51) Int. Cl.
H04N 7/16    (2006.01)
(52) U.S. Cl. ............ 725/152; 348/189; 725/68; 725/85; 725/100; 725/131; 725/139; 725/151
(58) Field of Classification Search ............ 725/68, 725/85, 100, 131, 139, 151–152; 348/189
See application file for complete search history.

(56) References Cited

U.S. PATENT DOCUMENTS 5,963,249 A * 10/1999 Kim ............ 348/178
7,216,170 B2 * 5/2007 Ludvig et al. ............ 709/225
7,623,933 B2 * 11/2009 Sarosi et al. ............ 700/83
2003/0028899 A1 2/2003 MacInnis
2005/0193413 A1 * 9/2005 Ellis et al. ............ 725/45
2005/0238316 A1 * 10/2005 MacDonald Boyce et al. ............ 386/46
2006/0123444 A1 * 6/2006 Schaffer et al. ............ 725/33
2007/0162930 A1 * 7/2007 Mickle et al. ............ 725/37
2007/0169162 A1 * 7/2007 Kola ............ 725/117

FOREIGN PATENT DOCUMENTS

| EP | 1624670 A2 | 2/2006 |
| EP | 1784019 A2 | 5/2007 |
| EP | 1816770 A2 | 8/2007 |
| WO | WO 98/43165 | 10/1998 |

OTHER PUBLICATIONS

OpenCable Specifications CableCARD Interface 2.0 Specification OC-SP-CCIF2.0-I04-060126, Jan. 26, 2006.*

* cited by examiner

Primary Examiner—Hunter B. Lonsberry
Assistant Examiner—Oschta Montoya
(74) Attorney, Agent, or Firm—McKenna Long & Aldridge LLP

(57) ABSTRACT

A host includes a controller configured to receive a request self-diagnostic to the host, wherein the request is for diagnostic information associated with memory allocated for an application. The controller is further configured to collect the requested diagnostic information.

16 Claims, 4 Drawing Sheets

FIG. 2

| Syntax | No. of Bits | Mnemonic |
|---|---|---|
| OCAP_memory_status_report() { | | |
|   Total_OCAP_memory_size | 32 | uimsbf |
|   Current_available_OCAP_memory_size | 32 | uimsbf |
|   Current_available_volatile_OCAP_memory_size | 32 | uimsbf |
|   Largest_available_volatile_OCAP_memory_size | 32 | uimsbf |
|   Total_nonvolatile_OCAP_memory_size | 32 | uimsbf |
|   Current_available_nonvolatile_OCAP_memory_size | 32 | uimsbf |
|   Largest_available_nonvolatile_OCAP_memory_size | 32 | uimsbf |
| } | | |

FIG. 3

| Syntax | No. of Bits | Mnemonic |
|---|---|---|
| memory_report() { | | |
|   number_of_memory | 8 | uimsbf |
|   if (i=0; i<number_of_memory; i++) { | | |
|     memory_type | 8 | uimsbf |
|     memory_size | 32 | uimsbf |
|   } | | |
| } | | |

BROADCAST RECEIVER AND METHOD FOR PROVIDING DIAGNOSTIC INFORMATION

This application claims the benefit of the Korean Patent Application No. 10-2006-0049576, filed on Jun. 1, 2006, which is hereby incorporated by reference as if fully set forth herein.

BACKGROUND

1. Field of the Disclosure

The present disclosure relates to content broadcasting technology, and more particularly, to a broadcast receiver, data structure and method for providing diagnostic information.

2. Background

Generally, a content broadcast system may include a broadcasting station transmitting contents through a wired (e.g., telephone or cable) or wireless (e.g., cellular or satellite) network and at least one host, such as a broadcast receiver, that receives the contents. The broadcast receiver may include a communication interface. Where the broadcast receiver does not have a communication interface, a communication card may be used by the broadcast receiver in order to interface with the broadcasting station.

In the case of cable broadcasting, a cable broadcasting station may be a system operator (SO) headend or a multiple system operator (MSO) head end. The SO may be a unified wire broadcast provider (i.e., local cable TV broadcast provider) and the MSO may be several SOs grouped together.

A cable broadcast receiver may be a digital built-in TV, a digital ready TV, etc. The cable broadcast receiver may employ an open cable system and may use a cablecard or a point of deployment (POD) module that may include a conditional access (CA) system. Alternatively, the cable broadcast receiver may have a built-in module that is a functional equivalent of the cablecard. In this instance, the cable broadcast receiver may receive a CA system, in a form of a software, that is downloadable from the SO or MSO and stored in a memory of the cable broadcast receiver. The downloadable software is usually referred to as download conditional access system (DCAS). As such, the cable broadcast receiver may have a configuration that may or may not require a separate cablecard.

Where a cablecard is required, the cablecard may use a personal computer memory card international association (PCMCIA) standard in order to interface with the cable broadcast receiver. The cablecard may be inserted in a slot provided at the cable broadcast receiver.

Meanwhile, a host may receive and process an OpenCable Application Platform (OCAP) service provided by a headend.

That is, the host must download an OCAP-Java (OCAP-J) application, such as an Electronic Program Guide (EPG) and a monitor application transmitted from a headend located at a remote place through a cable network, and drive the application on its system.

At this time, the host includes a memory having capacity suitable for driving the OCAP-J application as determined at the time of producing a product or a memory determined by the agreement between the headend and a manufacturer, in order to download and drive the OCAP-J application on its system.

However, since there is no a limitation in an OCAP service provided by the headend, only the monitor application, the EPG containing only basic functions, and an impulse pay-per-view (IPPV) service was provided when the service starts to be provided, but, in the future, a variety of services will be provided after an OCAP service environment is stabilized.

Accordingly, as a service provided by the headend gradually becomes complicated and various, the capacity of the memory necessary for ensuring the operation of the service will gradually increase.

However, a memory included in a host which is developed and sold at a specific time point has capacity required at that time. Therefore, when the service provided by the headend becomes complicated and various and the capacity of the memory required by the service increases, the memory included in the host no longer ensures the normal operation of the received service.

Such a problem cannot be solved by replacing a set-top box leased from the headend with a new set-top box.

SUMMARY

Accordingly, the present disclosure is directed to a broadcast receiver and a method for providing diagnostic information that substantially obviate one or more problems described above.

For example, the disclosure may disclose a broadcast receiver and a method for providing diagnostic information, by which memory status information of a host may be displayed on-screen display (OSD) window.

Advantages, objects, and features of the invention in part may become apparent in the description which follows and in part may become apparent to those having ordinary skill in the art upon examination of the following or may be learned from practice of the invention. The objectives and other advantages of the various embodiments of the invention may be realized and attained by the structures and processes described in the written description, in the claims, and in the appended drawings.

To achieve these objects and other advantages and in accordance with the purpose of the disclosure, as embodied and broadly described herein, a host includes a host controller configured to receive a request self-diagnostic to the host, wherein the request is for diagnostic information associated with memory allocated an application. The host controller further configured to collect the requested diagnostic information.

In another aspect, a method includes receiving a request self-diagnostic to the host, wherein the request is for diagnostic information associated with memory allocated for an application; collecting the requested diagnostic information in accordance with the request; and displaying the collected diagnostic information via on-screen display (OSD).

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the disclosure are incorporated in and constitute a part of this application. The drawings together with the description serve to explain the principle of the invention. In the drawings:

FIG. 2 is a diagram of an example of OCAP_memory_status_report( ) object syntax;

FIG. 3 is a diagram of an example of Memory_status_report( ) object syntax;

DETAILED DESCRIPTION

Reference will now be made in detail to broadcast receivers, data structures and methods for providing diagnostic information according to the various embodiments, examples of which are illustrated in the accompanying drawings. Wherever possible, the same reference numbers will be used throughout the drawings to refer to the same or like parts for simplicity. In this case, open cable application platform (OCAP) is taken as an example of a data broadcasting platform in describing the various disclosed embodiments.

Figure 1:
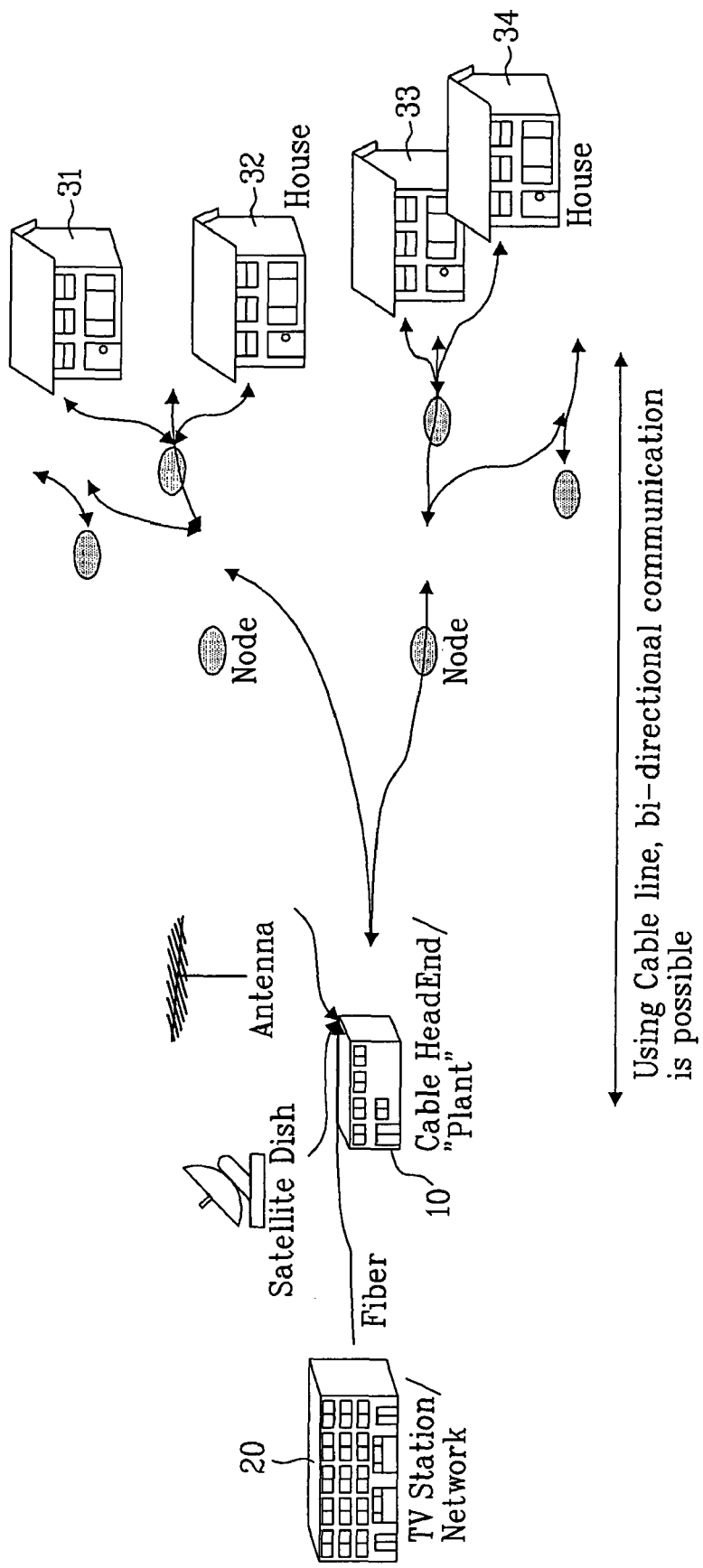
FIG. 1 is an exemplary diagram of a cable broadcast network.

FIG. 1 is an exemplary diagram of a cable broadcast network. Referring to FIG. 1, a cable headend or plant may receive cable broadcast signals via various communication networks from, for example, a television broadcasting station. The cable headend may deliver cable broadcast to a cable broadcast receiver, which may include a cablecard, via a network including nodes.

The cable broadcast receiver may communicate bi-directionally with the cable headend. In this case, the transmission/reception of data is achieved via a cable network capable of transferring data bi-directionally.

The cable broadcast receiver may be connected to various devices, such as a digital video disc (DVD) player, a digicam, a set-top box and the like. As services provided by the cable headend increase, the broadcast receiver may experience shortage of memory required for implementing the services.

The present disclosure is to efficiently use a memory included in a host for an application in the broadcast receiver. When a user makes a request for the self-diagnosis of the memory using a remote controller, the host may provide information about the status of the memory to the user.

Accordingly, the user may check the information about the status of the memory included in each host and select an adequate downloadable application or data.

At this time, a method of allowing the host to receive a diagnostic request for the status of the memory allocated to the host for the application and to collect, store and provide diagnostic information to the user is realized based on a predetermined protocol. The following description will be made using a host device diagnostic protocol used in an open cable as the predetermined protocol.

The host device diagnostic protocol operates regardless of the existence of a cablecard included in the broadcast receiver and starts to operate by a remote controller when a user or an after-sale service (A/S) engineer wants to view the diagnostic information.

That is, when the user makes a request for the diagnosis of the status of the memory included in the host using the remote controller, the diagnostic request is transmitted to the host by the host device diagnostic protocol. When the host receives the diagnostic request, the host collects the diagnostic information and displays the collected diagnostic information via an on-screen display (OSD) window.

Accordingly, the user or the A/S engineer may check the status of the memory allocated to the host for the application using the information and select an adequate downloadable application or data or provide after-sale service according to the status of the memory.

The host device diagnostic protocol is a preferred example of the present disclosure and the technical spirit of the present disclosure is not limited to this.

As described above, when the diagnostic request for the status of the memory allocated for the application (e.g. OCAP-J application) in a memory region included in the host is transmitted between the user and the host, the host device diagnostic protocol should contain a diagnostic identification indicating the diagnostic information about the status of the memory. Hereinafter, for example, a case of defining the diagnostic information about the memory allocated for the application or a case of using predefined diagnostic information will be described.

First, the case of defining the diagnostic information will be described.

Hereinafter, the host device diagnostic information containing the diagnostic identification indicating the diagnostic information about the status of the memory is shown in Table 1.

TABLE 1

| DIAGNOSTIC IDENTIFICATION |
|---|
| OCHD2 power status |
| OCHD2 boot status |
| OCHD2 memory allocation |
| Software version numbers of code in the OCHD 2 |
| Firmware version |
| MAC addresses |
| OCHD2 network addresses |
| Status of FDC |
| Status of FAT |
| Status of RDC |
| Current channel status |
| IEEE-1394 port status |
| DVI/HDVI port status |
| Status of DOCSIS transport channels |
| OCAP memory status |

At this time, the diagnostic information defined by the diagnostic identification may be displayed on the OSD or reported to the cablecard.

"OCHD2 power status" shall include, but are not limited to Host's power status, "OCHD2 boot status" shall include, but are not limited to Host's booting status, and "OCHD2 memory allocation" shall include, but are not limited to type of memory being reported (as applicable: ROM, DRAM, SRAM, Flash, HDD, DVD, and NVM) and physical size of memory type (in kilobytes, defined to 1024 bytes).

"Software version numbers of code in the OCHD 2" shall include, but are not limited to Application's name string, Application's version number, Software status (active, inactive or downloading), and if applicable Application's signature.

"Firmware version" shall include, but are not limited to Firmware version number of entire firmware image and Firmware's release or installation date of entire firmware image.

"MAC addresses" shall include, but are not limited to Type of devices being reported (as applicable: Host, CableCARD Device, IEEE-1394, universal serial bus (USB), embeded Cable Modem (eCM)) and MAC address of each reported device.

"OCHD2 network addresses" shall include, but are not limited to Network address of device.

"Status of FDC" shall include, but are not limited to forward data channel (FDC) center frequency, in MHz and Carrier lock status (e.g., LOCKED-NOT LOCKED).

"Status of FAT" shall include, but are not limited to modulation mode indicator; analog, 64 quadrature amplitude modulation (QAM) or 256 QAM, or other. If the currently tuned channel is a digital QAM channel, then carrier lock status, PCR lock status; the FAT channel tuner is locked or not locked to the currently tuned service and a numerical estimate of the channel's signal to noise ratio in tenths of a dB, and numerical estimate of the signal level in tenths of a dBmV (peak level for analog, average level for others).

"Status of RDC" shall include, but are not limited to RDC center frequency, in MHz, RDC transmitter power level, in dBmV, and RDC data rate (256 kbps, 1544 kbps or 3088 kbps).

"Current channel status" shall include, but are not limited to Channel type; analog or digital, authorization status; OCHD2 is authorized or not authorized for currently tuned service, purchasable status; currently tuned service MAY or MAY NOT be purchased, purchased status; currently tuned service is or is not purchased, preview status; currently tuned service is or is not in preview mode, if the OCHD2 is utilizing parental control, then parental control status; and currently tuned service is blocked or is not blocked via parental control.

"IEEE-1394 port status" shall include, but are not limited to Loop status (loop/no loop exists), root status (OCHD2 is/is not Root node), cycle master status (OCHD2 is/is not Cycle Master), A/D Source Selection status (Monitor does/does not support A/D source selection function, port connection status (Port 1—connected/not connected and Port 2—connected/not connected), total number of nodes (devices) connected to IEEE-1394 bus, with the following information for each node: device subunit type, A/D Source Selection Status, and EUI 64.

"DVI/HDVI port status" shall include, but are not limited to connection status (no connection exists, device connected-not repeater, device connected-repeater), connected device type, connected device color space, HDCP status (not enabled, enabled), Host Device HDCP status (non HDCP device, compliant HDCP device, and revoked HDCP device), video format (the number of horizontal lines associated with the video format on the DVI/HDMI link, the number of vertical lines associated with the video format on the DVI/HDMI link, the scan rate associated with the video format on the DVI/HDMI link, the aspect ratio associated with the video format on the DVI/HDMI link (4:3, 16:9), and progressive or interlaced video), and audio format (audio format type, audio sample size, and audio sample frequency).

"Status of DOCSIS transport channels" shall include, but are not limited to downstream center frequency, in MHz, downstream received power level, in dBmV, downstream carrier lock status (e.g., LOCKED/NOT LOCKED), upstream transmitter center frequency, in MHz, upstream transmitter power level, in dBmV, upstream symbol rate, in Msps, and upstream modulation type.

"OCAP memory status" shall include, but are not limited to the diagnostic information about the status of the memory allocated for the application, for example, an OCAP-J application, in a memory region included in the host. The diagnostic information about the status of the memory allocated for the OCAP-J application is defined as one piece of the diagnostic information in the host device diagnostic protocol such that the user can make a request for the diagnosis of the status of the memory allocated for the OCAP-J application in the memory region included in the host and the host can collect the diagnostic information according to the diagnostic request and display the collected diagnostic information via the ODS window.

Hereinafter, the diagnostic information will be described in more detail. FIG. 2 is a diagram of an example of OCAP_memory_status_report( ) object syntax. The object syntax may be variously defined to indicate the status of the memory, but, in the present specification, the technical spirit of the present disclosure will be described with reference to FIG. 2.

The host may ensure a region for an OCAP service in the memory region included previously. At this time, the memory includes, for example, a volatile memory and a non-volatile memory.

Now, the fields contained in the OCAP_memory_status_report( ) object syntax will be described.

A "Total_volatile_OCAP_memory_size" field is a 32-bit field that indicates the total size of a volatile OCAP memory for the OCAP-J application which is separated from a memory region for a native application. At this time, the unit of the total size of the volatile memory is kilobyte which is equal to 1024 bytes. A "Current_available_volatile_OCAP_memory_size" field is a 32-bit field that indicates the size of an available volatile OCAP memory ensured by the host on the basis of a time point when the user makes a request for the status information of OCAP memory allocation, in the total size of the volatile OCAP memory ensured by the "Total_volatile_OCAP_memory_size" field. This is obtained by subtracting the size of the used OCAP volatile memory from the total size of the OCAP volatile memory.

A "Largest_available_volatile_OCAP_memory_size" field is 32-bit field that indicates the size of a largest available continuous OCAP volatile memory ensured by the host on the basis of a point time when the user makes a request for the status information about the OCAP memory allocation. This is a portion of the size of the available volatile OCAP memory ensured by the host. This indicates the size of the largest available continuous memory in consideration of memory fragmentation. A "Total_non-volatile_OCAP_memory_size" field is a 32-bit field that indicates the total size of the non-volatile memory ensured by the host for the OCAP-J application. The unit of the total size of the non-volatile memory is kilobyte which is equal to 1024 bytes.

A "Current_available_non-volatile_OCAP_memory_size" field is a 32-bit field that indicates the size of the available non-volatile OCAP memory ensured by the host on the basis of a time point when the user makes a request for the status information about the OCAP memory allocation. This is obtained by subtracting the size of the used OCAP non-volatile memory from the total size of the OCAP non-volatile memory. A "Largest_available_non-volatile_OCAP_memory_size" field is a 32-bit field that indicates the size of the largest available continuous OCAP non-volatile memory ensured by the host on the basis of a time point when the user makes a request for the status information about the OCAP memory allocation. This is a portion of the size of the available non-volatile OCAP memory ensured by the host. This indicates the size of the largest available continuous memory in consideration of memory fragmentation.

Accordingly, when the user makes a request for the diagnosis of the status of the memory allocated for the OCAP service in the memory region included previously, the host collects the diagnostic information according to the request, displays the collected diagnostic information via the OSD window, and provides the collected diagnostic information to the user.

Next, the case of using the predefined diagnostic information will be described.

In this case, the "OCAP memory status" field of the diagnostic information shown in Table 1 is not contained and other diagnostic information, for example, an "OCHD2 memory allocation" field is used.

That is, when the host receives a diagnostic request having a diagnostic ID of the "OCHD2 memory status" field from the user, the host may collect the following information and the display the information via the OSD window according to the request. FIG. 3 is a diagram of an example of Memory_status_report( ) object syntax.

The Memory_status_report( ) object syntax may contain, for example a "number_of _memory" field, a "memory_type" field, and a "memory_size" field.

Hereinafter, the fields will be described.

The "number_of_memory" field indicates the number of memory types.

The "memory_type" field specifies the type of the memory and the value of the memory type may be, for example, defined as shown in Table 2.

TABLE 2

| | Memory Type |
|---|---|
| 0x00 | ROM |
| 0x01 | DRAM |
| 0x02 | SRAM |
| 0x03 | Flash |
| 0x04 | NVM |
| 0x05 | Hard drive |
| 0x06 | Video memory |
| 0x07 | Other memory |
| 0x08 | OCAP DRAM |
| 0x09 | OCAP SRAM |
| 0x0A | OCAP Flash |
| 0x0B | OCAP NVM |
| 0x0C | OCAP Hard drive |
| 0x0D | OCAP Memory Card |
| 0x0E~0xFF | reserved(unused) |

The "memory_size" field may specify the physical size of the memory type according to the value of the memory type. The unit thereof may be kilobyte which is equal to 1024 bytes.

Referring to Table 2, '0x08' to '0x0D' define information about the memory allocated for the OCAP service in the memory region which is previously included in the host.

Accordingly, the host may collect and display the diagnostic information via the OSD window when the host receives the diagnostic request for the status of the memory allocated for the OCAP service from the user.

The host may provide the collected diagnostic information about the status of the memory to a headend through a cable network when a communication device (for example, a cablecard) is mounted in the host. The headend may record the diagnostic information about the status of the memory allocated for the OCAP service in the memory region included in each host in an application database of its application server. Accordingly, the headend may determine a downloadable application which can be driven by the host by managing and using the diagnostic information about the status of the memory allocated for the OCAP service in the memory region included in each host.

For example, when the application database for recording the diagnostic information about the status of the memory allocated for the OCAP service in the memory region included in each host is managed from each host, the headend may define a host which is determined that the memory size thereof has the capacity sufficient to drive all downloadable OCAP-J applications provided by the headend as a 'full OCAP-J Application code image', and define a host which is determined that the memory size thereof has the capacity insufficient to drive all downloadable OCAP-J applications provided by the headend as a 'light-weight OCAP-J Application code image', using the diagnostic information about the status of the memory allocated for the OCAP service in the memory region included in the host. As a method for forming the 'light-weight OCAP-J Application code image', for example, a method for allowing an even host having low capability to normally drive the code image at the sacrifice of the quality of a graphical image for determining the look and feel of the application may be used. Alternatively, a method for deleting a service which requires a large memory size or a user interface (UI) composed of a graphical image or changing a service which operates for the service or the structure of the UI to reduce the use of the CPU may be used.

That is, when the headend receives the diagnostic information about the status of the memory allocated for the OCAP service in the memory region included in each host connected through the cable network and records the information in the application database of the application server, each host is defined as any one of the 'full OCAP-J Application code image' and the 'light-weight OCAP-J Application code image'.

The headend may select a code image suitable for each host and selectively download a downloadable application suitable for each host connected through the cable network, using the information recorded in the application database.

That is, the headend may define each host as the 'full OCAP-J Application code image' or the 'light-weight OCAP-J Application code image' using the diagnostic information about the status of the memory allocated for the OCAP service in the memory region included in each host on the application server, with respect to each host which is connected through the cable network and managed by the headend.

Defining each host as the 'full OCAP-J Application code image' or the 'light-weight OCAP-J Application code image' by the host does not mean that the application is divided into two stages. That is, the division number of the application database may be proportional to how many times the memory size of the hosts are explicitly changed in the protocol related to the policy of the headend or how many times the headend and the manufacturer agree with each other with respect to the memory size.

Figure 4:
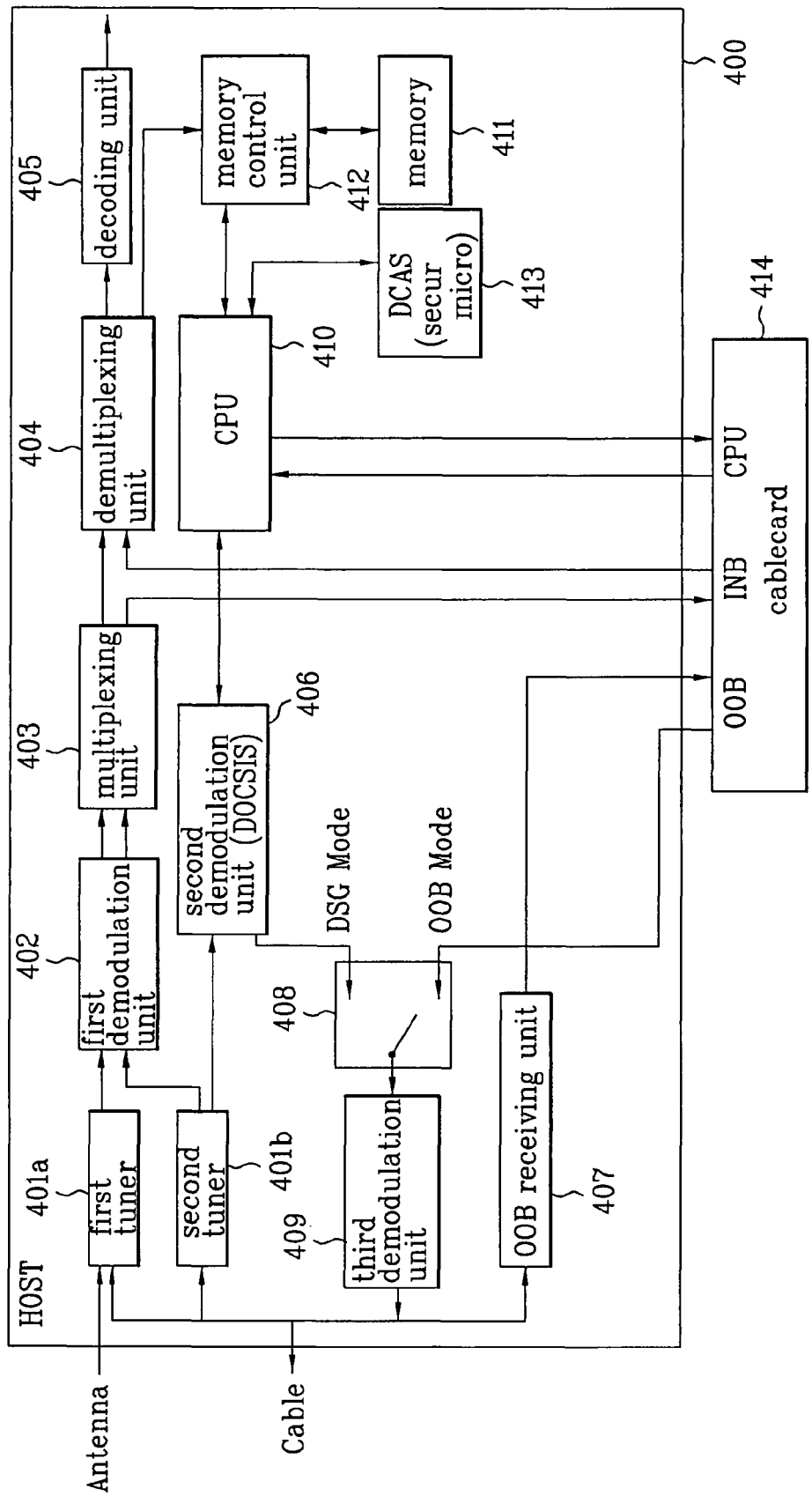
FIG. 4 is a block diagram of an exemplary cable broadcast receiver.

Next, when the user makes a request for the diagnosis of the status of the memory allocated for the OCAP service in the memory region included in each host, the digital broadcast receiver for receiving and processing the request will be described. FIG. 4 is a block diagram of an exemplary cable broadcast receiver.

A cable broadcast receiver according to the present disclosure shown in FIG. 4 may include a host and a communication device which can be attached to or detached from the host. At this time, the communication device may include a cablecard. The host may include a downloadable conditional access system (DCAS) having a function similar to the cablecard.

In general, the host can receive only a cable broadcasting signal or receive at least one of a cable broadcasting signal, a terrestrial broadcasting signal and a satellite broadcasting signal.

Meanwhile, a bi-directional communication method between a cable broadcast receiver and a broadcasting station includes two modes. As a mode for an uplink service in an open cable, there are an out-of-band (OOB) mode and a DOCSIS Set-top Gateway (DSG) mode.

Accordingly, a viewer can selectively view a desired program through the host using any one of the two modes. Alternatively, a viewer can directly participate in a broadcasting program or selectively view necessary information. A data broadcasting service may be provided through the two modes.

The OOB mode is the standard of transport specifications between a headend (cable broadcasting station) and an intersec instrument within a set-top box. The DSG mode indicates a transport mode between a cable modem control system of a cable broadcasting station and a data-over-cable service interface specifications (DOCSIS)-based cable modem within a set-top box. At this time, the DOCSIS can transmit data using the cable modem.

The broadcast receiver according to the present disclosure is a cable broadcast receiver using a combination of the OOB mode and the DSC mode.

The host 400 includes a first tuner 401*a*, a second tuner 401*b*, a first demodulator 402, a multiplexer 403, a demultiplexer 404, a decoder 405, a second demodulator (DOCSIS) 406, an OOB receiver 407, a switching unit 408, a third demodulator 409, a CPU 410, a memory 411, a memory controller 412, and a downloadable conditional access system (DCAS) 413.

The first tuner 401*a* tunes only a specific channel frequency of a cable audio/video (A/V) broadcasting signal transmitted in-band through a cable or a terrestrial A/V broadcasting signal transmitted through an antenna, and outputs the tuned signal to the first modulator 402.

At this time, the terrestrial broadcasting signal may be modulated by a Vestigial Sideband Modulation (VSB) method and the cable broadcasting signal may be modulated by a quadrature amplitude modulation (QAM) method.

The first demodulator 402 may demodulate the terrestrial broadcasting signal and the cable broadcasting signal according to the respective modulation methods although the methods for transmitting the signals are different from each other. Accordingly, the first demodulator 402 may demodulate the signal selected by the first tuner 401*a* by the VSB method or the QAM method.

The signal demodulated by the first demodulator 402 is multiplexed by the multiplexer 403 such that the cable broadcasting signal is output to the cablecard 414 and the terrestrial broadcasting signal is output to the demultiplexer 404.

The embodiment shown in FIG. 4 shows a case where the cablecard 414 can process multi-stream. Accordingly, the cablecard 414 allows a user to view broadcasting information input by multiplexing at least two streams through the host 400.

The demultiplexer 404 receives the multiplexed broadcasting signal, demultiplexes the received broadcasting signal into a plurality of streams, and outputs the plurality of streams.

The decoder 405 receives and decodes the broadcasting signal demultiplexed by the demultiplexer 404. The decoder 405 decodes the demultiplexed broadcasting signal and outputs an A/V signal which can be viewed by the user.

The second tuner 401*b* tunes a specific channel frequency of the data broadcasting signal transmitted through the cable in the DSC mode and outputs the tuned signal to the second demodulator 406. The second demodulator 406 demodulates the data broadcasting signal of the DSC mode and outputs the demodulated broadcasting signal to the CPU 410.

The third tuner 407 tunes a specific channel frequency of a downlink data broadcasting signal transmitted through the cable in the OOB mode and outputs the tuned signal to the cablecard 414.

If bi-directional communication between the headend and the cable broadcast receiver is possible, uplink information (e.g. pay program application, diagnostic information of the host, or the like) transmitted from the cable broadcast receiver to the headend may be transmitted in the OOB mode or the DSG mode. Accordingly, the cable broadcast receiver according to the embodiment of the present disclosure may include the switching unit 408 so as to select any one of the modes and transmit information.

In the OOB mode, user information or system diagnosis information is output to the third modulator 409 through the cablecard 414 and the switching unit 408 and the third modulator 409 modulates the output signal using a quadrature phase shift keying (QPSK) modulation method and transmits the modulated signal to the headend through the cable. If the broadcasting signal of the user is transmitted in the DSG mode, the information is output to the modulator 409 through the CPU 410 and the switching unit 408 and is then modulated by the modulator 409 using a QAM-16 modulation method to be transmitted to the headend through the cable.

Then, the memory controller 412 receives a diagnostic request for the status of the memory 411, collects diagnostic information as defined in FIG. 2 or 3 with respect to the status of the memory, and transmits the diagnostic information to the CPU 410.

The CPU 410 may display the diagnostic information about the status of the memory 411 received from the memory controller 412 via the OSD window.

That is, the CPU 410 of the host receives the diagnostic request, determines what the diagnostic request is, and instructs the memory controller 412 to collect the diagnostic information according to the diagnostic request if the diagnostic request is for the status of the memory 411 included in the host.

The memory controller 412 may collect the diagnostic information under the control of the CPU 410. The memory controller 412 may transmit the diagnostic information to the CPU 410 when the collection of the diagnostic information is completed.

Accordingly, the CPU 410 may contain the diagnostic information in the OSD window and output it on the screen when receiving the diagnostic information collected by the memory controller 412.

The cablecard 414 shown in FIG. 4 may receive a multi-stream broadcasting signal from the multiplexer 403 when receiving the terrestrial broadcasting signal. At this time, when the received broadcasting signal is scrambled, the cablecard 414 descrambles the scrambled broadcasting signal such that the cable broadcasting signal is normally viewed.

The DCAS 413 shown in FIG. 4 is a microprocessor having a function similar to the cablecard 414, which operates as a descramble unit on the host regardless of the existence of the cablecard 414.

The structure of the broadcast receiver according to the present disclosure is applicable to various kinds of hosts having a diagnostic function and a downloadable application function, such as an application configuration access protocol (ACAP) and a multimedia home platform (MHP), as well as an OCAP.

Figure 5:
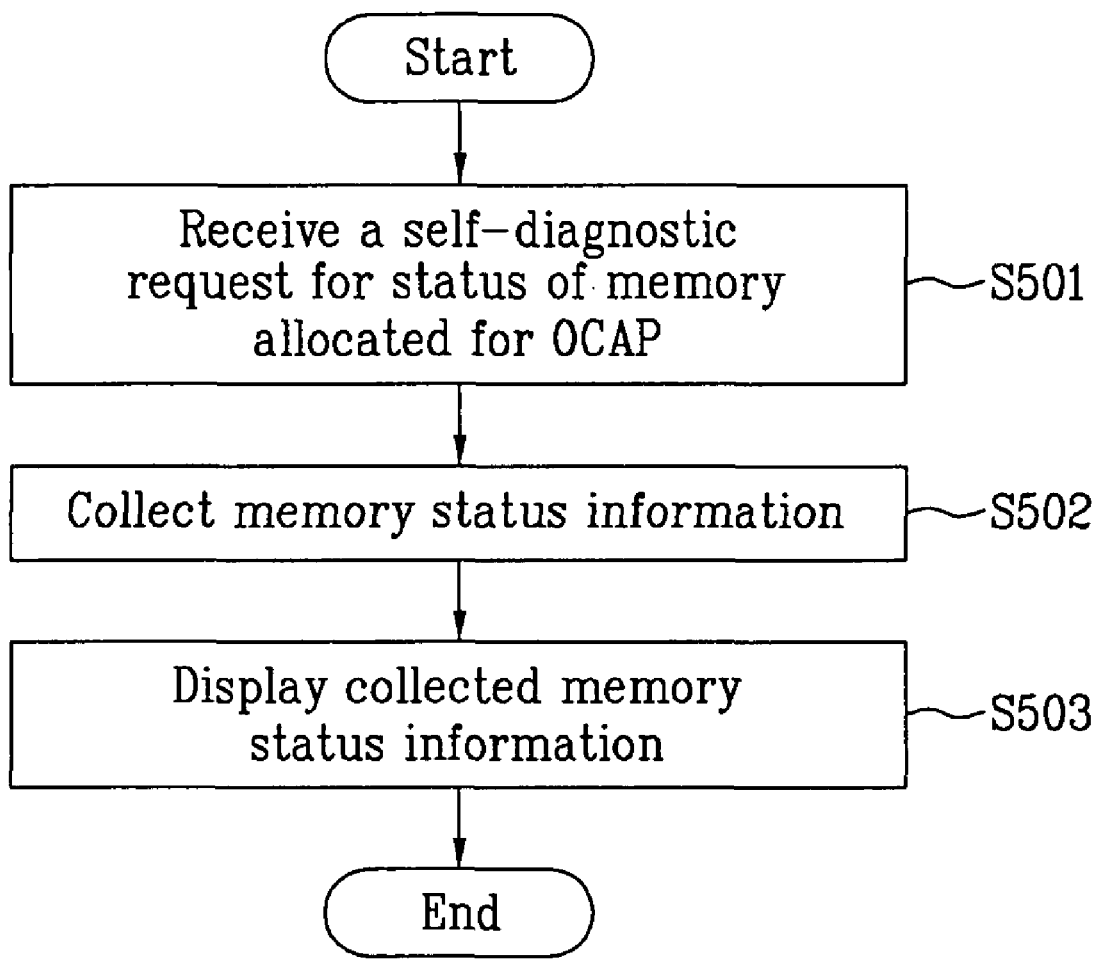
FIG. 5 is an exemplary flowchart of a method of transmitting memory status diagnostic information.

Hereinafter, a method of processing and displaying diagnostic information in the digital broadcast receiver will be described. FIG. 5 is an exemplary flowchart of a method of transmitting memory status diagnostic information.

The host receives a self-diagnostic request for the status of the memory allocated for the OCAP service in the memory included in the host from a user by the key input of a remote controller (S501) and collects diagnostic information about the status of the memory according to the received diagnostic request (S502). At this time, the collected diagnostic information about the status of the memory is, for example, shown in FIG. 2 or 3.

The collected diagnostic information is stored and the stored diagnostic information is displayed via the OSD window (S503).

By the above-described process, the host may output the diagnostic information about the status of the memory allocated for an application or data in the memory region included in the host via the OSD window. In FIG. 5, the method of allowing the host to receive the self-diagnostic request from the user and to output the collected diagnostic information via the OSD window according to the received request is realized by a predetermined protocol (e.g. a host device diagnostic protocol). Accordingly, the above-described process is realized regardless of the existence of the cablecard.

However, if the host transmits the collected diagnostic information about the status of the memory to the headend through the cablecard, the headend determines the code image of each host and records the code image in an application database on the basis of the diagnostic information about the status of the memory of each host such that an adequate OCAP-J application can be selectively downloaded to the host.

As described above, the host device diagnostic protocol can be extended and defined by defining new diagnostic information or using the existing diagnostic information. Accordingly, compatibility can be achieved.

It will be appreciated that, in the above description and other features and functions, or alternatives thereof, they may be implemented on a programmed microprocessor, a microcontroller, an integrated circuit element such as an application specific integrated circuit (ASIC), a programmable logic device (PLD), a programmable logic array (PLA), a field-programmable gate array (FPGA), or a phase alternation by line system (PAL), or the like, a hardwired electronic or logic circuit, or a programmable logic device.

It will be appreciated that the described flow processes or data structures can be implemented as a self-consistent sequence of computerized steps that lead to a desired result. These steps can be defined by and/or in one or more computer instructions stored in a computer-readable medium, or can be encompassed using a signal, or provided as software instructions to a processing device.

These steps can be performed by a processor executing the instructions that define the steps. Further, the flow process can be performed by a processor executing one or more appropriate programs, by special purpose hardware designed to perform the method, or by any combination of such hardware, firmware and software elements.

The communication device defined in the present specification can perform the existing function by downloading a software conditional access system (CAS) module provided by a provider to a set-top box or an integral television receiver of a subscriber, instead of separately mounting the existing hardware CAS in the set-top box or an integral television receiver of the subscriber.

As an example of a method of downloading the software CAS module, a method of automatically downloading a conditional access image from the headend when a security processor which is previously mounted in the set-top box is connected to a network may be performed.

The present disclosure is not limited to the above-described embodiments. It will be apparent to those skilled in the art that various modifications and variations can be made in the present disclosure without departing from the spirit or scope of the disclosure.

The above-described values are preferred embodiments or simple examples and the scope of the present disclosure is not limited to the above-described values. Thus, it is intended that the present disclosure covers the modifications and variations of this disclosure provided they come within the scope of the appended claims and their equivalents.

What is claimed is:

1. A host in a cable broadcasting receiver, the host comprising:
a host controller configured to:
receive diagnostic request for diagnostic information associated with a dynamic random access memory (DRAM) allocated to Java applications and diagnostic information associated with a memory allocated to a host system, and
control to collect the requested diagnostic information associated with the DRAM allocated to the Java applications and diagnostic information associated with a memory allocated to a host system,
wherein the collected diagnostic information associated with the DRAM allocated to the Java applications includes first information indicating a total amount of the DRAM allocated to the Java applications, and second information indicating an amount of the DRAM that is not allocated and is available for use in the total amount of the DRAM allocated to the Java applications, and
wherein the collected diagnostic information associated with the memory allocated to the host system includes type information indicating a type of a memory of the host system and size information indicating a physical size of the memory of the host system.

2. The host of claim 1, wherein the host controller further configured to control the collected diagnostic information to store.

3. The host of claim 2, wherein the host controller further configured to receive a user's input associated with selecting any one of the Java applications based upon the collected diagnostic information.

4. The host of claim 1, wherein the diagnostic information associated with the DRAM allocated to the Java applications further includes information on an amount of largest available continuous of the DRAM.

5. The host of claim 1, wherein the host controller further configured to collect diagnostic information associated with a memory allocated to the Java applications, the memory including any one type of a static random access memory (SRAM), a flash memory, a non-volatile memory (NVM), a hard drive (HDD) and a memory card.

6. The host of claim 1, wherein the host controller determines, based upon a value, whether the diagnostic request is for the diagnostic information associated with the DRAM allocated to the Java applications.

7. The host of claim 6, wherein the value includes an identifier of the diagnostic request.

8. The host of claim 1, wherein the Java applications include a downloadable OCAP application.

9. The method of claim 1, wherein the Java applications include a downloadable OCAP application.

10. A method of processing diagnostic information in a cable broadcasting receiver, the method comprising:
receiving diagnostic request for diagnostic information associated with a dynamic random access memory (DRAM) allocated to Java applications and diagnostic information associated with a memory allocated to a host system; and
controlling to collect the requested diagnostic information associated with the DRAM allocated to the Java applications and diagnostic information associated with a memory allocated to a host system,
wherein the collected diagnostic information associated with the DRAM allocated to the Java applications includes first information indicating a total amount of the DRAM allocated to the Java applications, and second information indicating an amount of the DRAM that is not allocated and is available for use in the total amount of the DRAM allocated to the Java applications, and wherein the collected diagnostic information associated with the memory allocated to the host system includes type information indicating a type of a memory of the host system and size information indicating a physical size of the memory of the host system.

11. The method of claim 6 further comprises storing the collected diagnostic information.

12. The method of claim 11 further comprising the step of receiving a user's input associated with selecting any one of the Java applications based upon the collected diagnostic information.

13. The method of claim 12 further comprising the step of determining, based upon a value, whether the diagnostic request is for the diagnostic information associated with the DRAM allocated to the Java applications.

14. The method of claim 13, wherein the value includes an identifier of the diagnostic request.

15. The method of claim 10, wherein the diagnostic information associated with the DRAM allocated to the Java applications further includes information on an amount of a largest available continuous of the DRAM.

16. The method of claim 10, further comprises receiving a diagnostic request for diagnostic information associated with a memory allocated to Java applications, the memory including any one type of a static random access memory (SRAM), a flash memory, a non-volatile memory (NVM), a hard drive (HDD) and a memory card.

* * * * *